(12) United States Patent
Miyano

(10) Patent No.: US 9,087,042 B2
(45) Date of Patent: Jul. 21, 2015

(54) TESTING DEVICE, TESTING METHOD, AND COMPUTER-READABLE RECORDING MEDIUM HAVING TESTING PROGRAM STORED THEREIN

(71) Applicant: FUJITSU LIMITED, Kawasaki-shi (JP)

(72) Inventor: Takanobu Miyano, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 283 days.

(21) Appl. No.: 13/724,533

(22) Filed: Dec. 21, 2012

(65) Prior Publication Data

US 2013/0254593 A1 Sep. 26, 2013

(30) Foreign Application Priority Data

Mar. 23, 2012 (JP) .................... 2012-67011

(51) Int. Cl.
  *G06F 11/00* (2006.01)
  *G06F 11/273* (2006.01)
  *G06F 11/26* (2006.01)

(52) U.S. Cl.
  CPC ............ *G06F 11/2733* (2013.01); *G06F 11/26* (2013.01)

(58) Field of Classification Search
  CPC ..... G06F 11/2733; G06F 11/24; G06F 11/27; G06F 11/26; G06F 11/273; G06F 11/2736; G06F 11/30; G06F 11/3003

USPC .......... 714/27, 25, 30, 31, 32, 37, 40, 41, 43, 714/44, 47.1, 48
  See application file for complete search history.

(56) References Cited

U.S. PATENT DOCUMENTS

| | | | |
|---|---|---|---|
| 6,571,360 B1* | 5/2003 | Drogichen et al. ............. | 714/44 |
| 6,704,827 B1* | 3/2004 | Smith et al. ..................... | 714/25 |
| 2007/0201372 A1* | 8/2007 | Tong et al. ..................... | 370/241 |
| 2012/0272101 A1* | 10/2012 | Chi ................................ | 714/37 |
| 2013/0151898 A1* | 6/2013 | Hou ............................... | 714/27 |

FOREIGN PATENT DOCUMENTS

| | | |
|---|---|---|
| JP | H10-227879 | 8/1998 |
| JP | 2008-249330 | 10/2008 |

* cited by examiner

*Primary Examiner* — Joseph D Manoskey
(74) *Attorney, Agent, or Firm* — Fujitsu Patent Center

(57) ABSTRACT

The processor allows an apparatus to repeat the to-be-tested processing plural times and perform the disconnecting operation, that disconnects a device from the apparatus by the switch or the connecting operation that connects the device to the apparatus by the switch, at different timings during the to-be-tested processing whenever the to-be-tested processing is repeated in the apparatus. By doing this, it is possible to shorten the time required to test the to-be-tested processing.

20 Claims, 15 Drawing Sheets

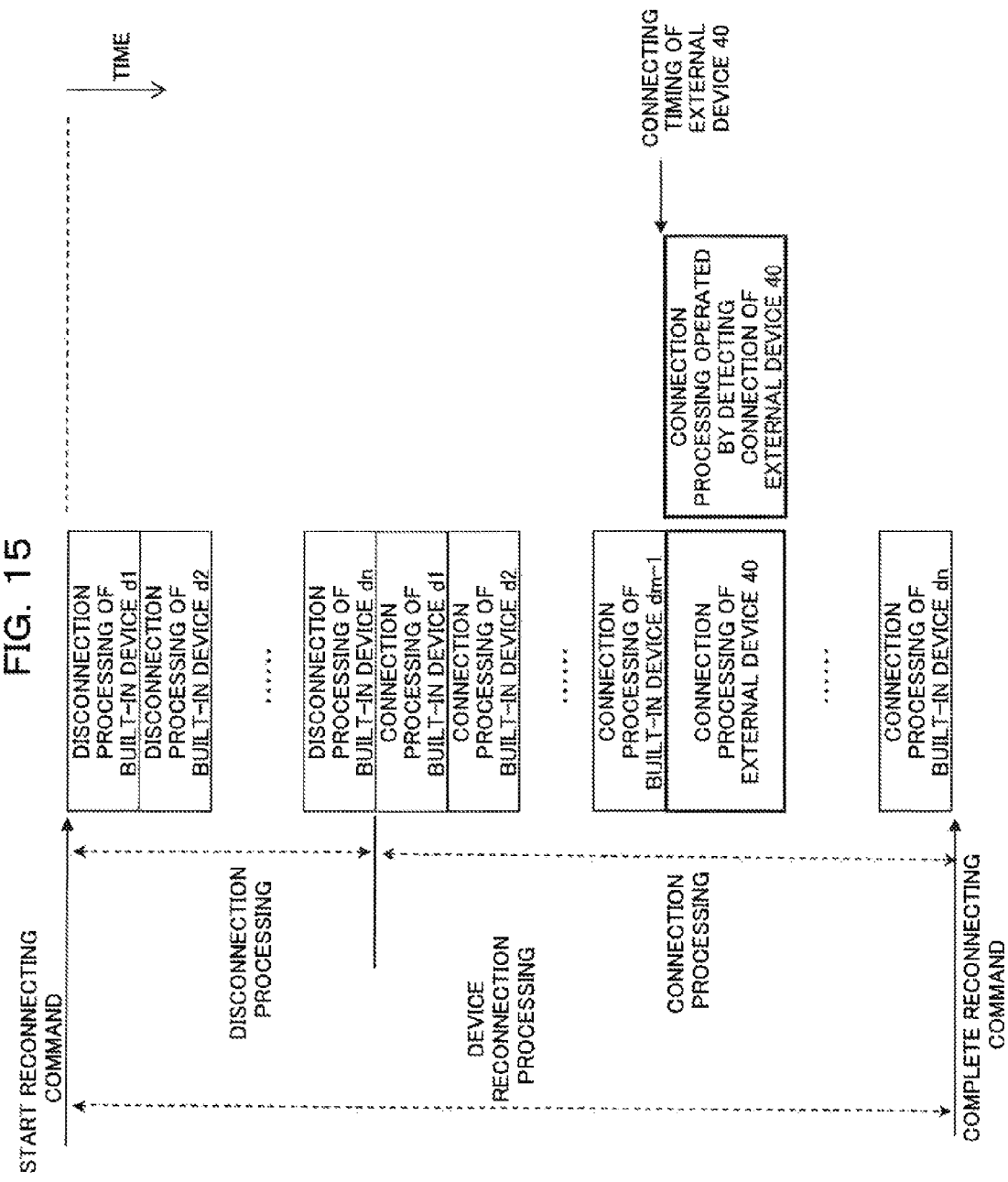

US 9,087,042 B2

TESTING DEVICE, TESTING METHOD, AND COMPUTER-READABLE RECORDING MEDIUM HAVING TESTING PROGRAM STORED THEREIN

CROSS-REFERENCE TO RELATED APPLICATION

This application is based upon and claims the benefit of priority of the prior Japanese Patent Application No. 2012-67011 filed on Mar. 23, 2012, the entire contents of which are herein by reference.

FIELD

The present invention relates to a testing device, a testing method, and a computer-readable recording medium having a testing program stored therein.

BACKGROUND

FIG. 9 is a block diagram illustrating a configuration of a server 30 that connects an external device 40. The server 30 illustrated in FIG. 9 includes a BIOS (basic input output system) 31, a port 32, a keyboard 34, and a display 35. A connector 42 of the external device 40 which is connected to the server 30 is inserted into the port 32 and the external device 40 is connected to the server 30 through the connector 42 and a cable 41. The server 30 is provided with the keyboard 34 which inputs various information in accordance with the manipulation of an operator and the display 35 that displays the various information to notify the information to the operator.

After the BIOS 31 runs, if the external device 40 is connected to the server 30, the BIOS 31 detects the connection of the external device 40 and performs connection processing of the device 40. The connection processing is processing that associates the device 40 with a device driver of the BIOS 31.

Further, after connecting the external device 40 to the server 30 to perform the connection processing of the device 40, if the external device 40 is disconnected from the server 30, the BIOS 31 detects the disconnection of the device 40 and performs disconnection processing of the device 40. The disconnection processing is processing that disassociates the device 40 from the device driver of the BIOS 31.

The connection processing and the disconnection processing that are performed in association with the connecting/disconnecting operation of the external device 40 with/from the server 30 as described above are normal device recognition processing of the BIOS 31 and also performed at the time of a device reconnection processing which will be described below.

In the server 30 as illustrated in FIG. 9, the device reconnection processing is performed by the BIOS 31 in accordance with a reconnecting command.

The device reconnection processing is processing at the side of the BIOS 31, that is, processing which is performed by the BIOS 31. The device reconnection processing performs the disconnection processing that disassociates the device mounted in the server 30 or the external device 40 connected to the server 30 from the device driver of the BIOS 31, and then performs the connection processing that associates the devices with the device driver again. Further, the device which is mounted in the server 30 is referred to as a "built-in device". A command which performs the device reconnection processing on all the built-in device of the server 30 and the external device 40 connected to the server 30 is a reconnecting command.

If a device to be supported is newly set in the server 30, for example, the device reconnection processing is performed in order to associate the device with the device driver again. The device reconnection processing, for example, is performed as the operator manipulates the keyboard 34 to input the reconnecting command.

FIG. 10 is a timing chart explaining a procedure of the device reconnection processing by the BIOS 31 which is performed in the server 30 having n built-in devices d1 to dn in accordance with one reconnecting command. Further, n is a natural number which is 2 or larger. Here, it is considered that the external device 40 is not connected to the server 30. In this case, if the reconnecting command is received to start the device reconnection processing, as illustrated in FIG. 10, first, the BIOS 31 sequentially performs the disconnection processing from the built-in device d1 to the built-in device dn. Next, the BIOS 31 sequentially performs the connection processing from the built-in device d1 to the built-in device dn.

FIG. 11 is a timing chart explaining a procedure of the device reconnection processing by the BIOS 31 which is performed in the server 30 which has built-in devices d1 to dm−1 and dm+1 to dn and is connected to the external device in advance in accordance with one reconnecting command, m is a natural number which is larger than 1 and less than n and the disconnection processing or the connection processing of the external device 40 is performed in the m-th order among of the disconnection processing or the connection processing of the n devices including the external device 40. The devices (the built-in devices and the external device 40) in the server 30 are managed as a tree by the BIOS 31 and the value of m is determined in accordance with the position of the external device 40 in the tree. In this case, if the reconnecting command is received to start the device reconnection processing, as illustrated in FIG. 11, first, the BIOS 31 sequentially performs the disconnection processing of the built-in devices d1 to dm−1, the external device 40, and the built-in devices dm+1 to dn. Next, the BIOS 31 sequentially performs the connection processing of the built-in devices d1 to dm−1, the external device 40, and the built-in devices dm+1 to dn.

However, while the BIOS 31 performs the device reconnection processing, the operator may perform connecting/disconnecting manipulation of the external device 40 to/from the server 30. In this case, the disconnection processing or the connection processing of the external device 40 by the device reconnection process may compete against the disconnection processing or the connection processing which is performed by the BIOS 31 in accordance with the connecting/disconnecting manipulation of the external device 40 by the operator.

If the above-mentioned competition occurs, resources may become scrambled in the server 30, which causes failures such as hang-up.

SUMMARY

A testing device according to the present invention includes a switch which connects or disconnects a device to or from an apparatus that performs to-be-tested processing, and a processor. The processor allows the apparatus to repeatedly perform the to-be-tested processing plural times and allows the switch to perform the disconnecting operation that disconnects the device from the apparatus or the connecting operation that connects the device to the apparatus at different timings whenever the to-be-tested processing is performed in the apparatus.

Further, a testing method according to the present invention is a method of testing to-be-tested processing by a processor using a switch that connects or disconnects a device and an apparatus that performs the to-be-tested processing. The method includes repeatedly performing the to-be-tested processing in the apparatus plural times; and performing a disconnecting operation that allows the switch to disconnect the device from the apparatus or a connecting operation that allows the switch to connect the device to the apparatus at different timings whenever the to-be-tested processing is performed in the apparatus.

In addition, a testing program according to the present invention causes a processor to execute a process for testing to-be-tested processing using a switch that connects or disconnects a device and an apparatus that performs the to-be-tested processing, the process including: repeatedly performing the to-be-tested processing in the apparatus plural times; and performing a disconnecting operation that allows the switch to disconnect the device from the apparatus or a connecting operation that allows the switch to connect the device to the apparatus at different timings whenever the to-be-tested processing is performed in the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 15 is a timing chart illustrating a state when the competition of the connection processing occurs in the server of FIG. 9.

DESCRIPTION OF THE PREFERRED EMBODIMENTS

Figure 1:
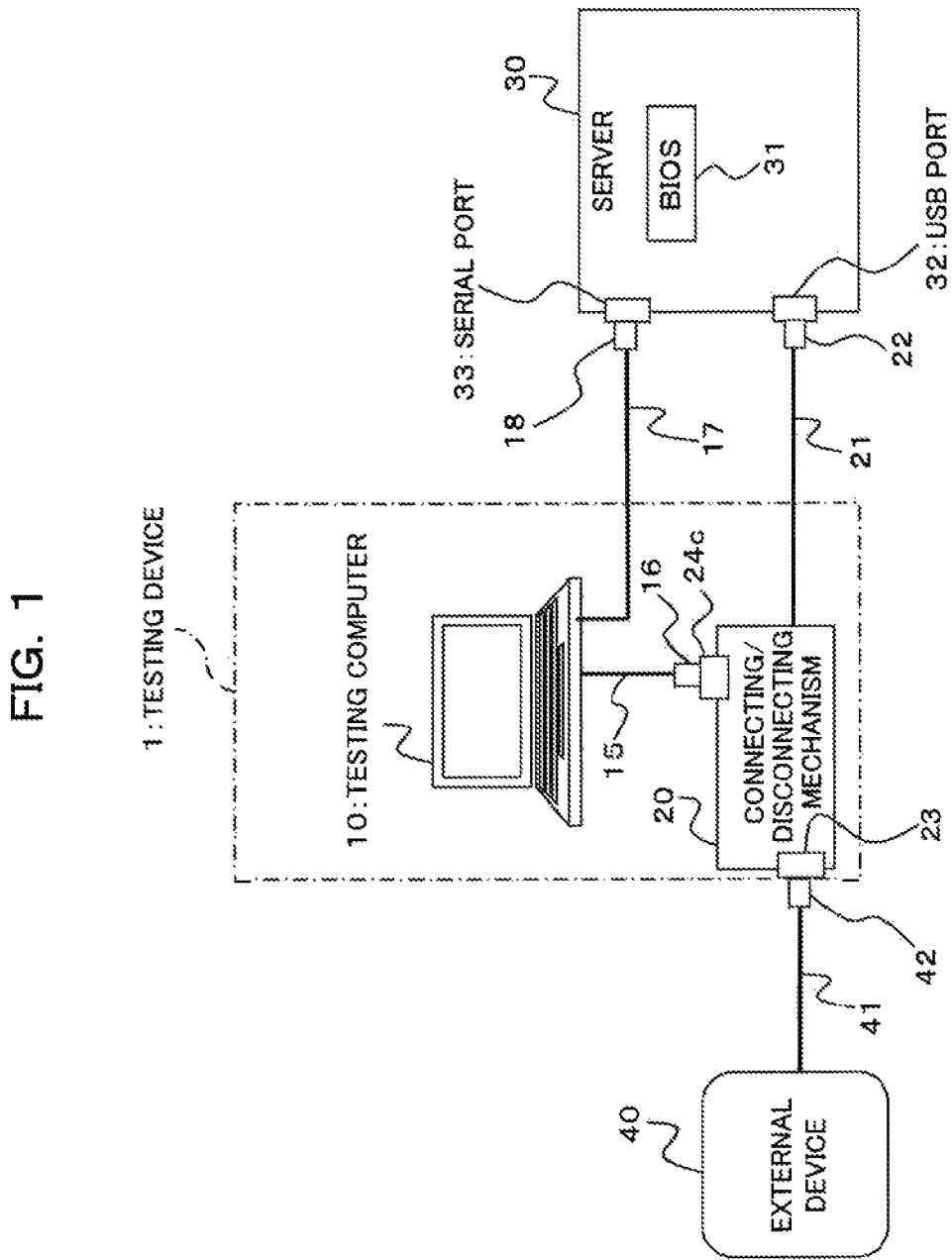
FIG. 1 is a block diagram illustrating a hardware configuration of a testing device according to an embodiment.

Hereinafter, embodiments will be described with reference to the drawings.

[1] Test of Device Reconnection Processing

The test of the device reconnection processing, for example, is performed by the following procedure. In other words, in the state where a BIOS 31 runs, an operator inputs a reconnecting command from a keyboard 34 to allow the BIOS 31 to perform the device reconnection processing. The operator connects or disconnects a connector 42 to or from a port 32 at an appropriate timing in parallel with the device reconnection processing. The operator repeats the above processing while changing the connection or disconnection timing of the external device 40 (connector 42) to cause a competition of the disconnection processing or the connection processing for a long time. A method same as the above test is also used when a failure is reproduced and verified if the failure of the device reconnection processing occurs during the operation.

In the test of the device reconnection processing, it is required to cause the following two competitions (1) and (2) to verify occurrence of a failure (error).

(1) Competition of disconnection processing of an external device 40 by a reconnecting command and disconnection processing of the external device 40 by detection of the disconnection of the external device 40

(2) Competition of connection processing of the external device 40 by the reconnecting command and connection processing of the external device 40 by detection of the connection of the external device 40

In accordance with a flowchart (steps S11 to S16) illustrated in FIG. 12, a procedure when the competition of the disconnection processing is caused while the device reconnection processing is performed by the BIOS 31 will be described.

The operator inserts a connector 42 of the external device 40 into a port 32 of a server 30 (step S11) and inputs a reconnecting command to the server 30 using a keyboard 34 to allow the BIOS 31 to perform the device reconnection processing (step S12). The operator inputs the reconnecting command and then manually pulls out the connector 42 from the port 32 at an appropriate timing when it is considered that the disconnection processing of the external device 40 is performed by the device reconnection processing (step S13). By doing this, the external device 40 is disconnected from the server 30.

In association with the disconnecting manipulation, the BIOS 31 detects the disconnection of the external device 40 and performs the disconnection processing of the external device 40. Thereafter, the operator waits until the reconnecting command finishes (step S14) and searches errors (step S16) if there are any errors, for example, hang-up failure occurs (Yes route in step S15).

In the meantime, if no error occurs (No route in step S15), the operator returns to step S11 and repeatedly performs the same processing. In this case, the operator intends to cause the competition of the disconnection processing and manually disconnects the external device 40 while varying the timing in step S13. Even when the processing of step S11 to S14 are repeated predetermined times, if the error does not occur, the operator judges that the error due to the competition of the disconnection processing does not occur and completes the test.

Figure 12:
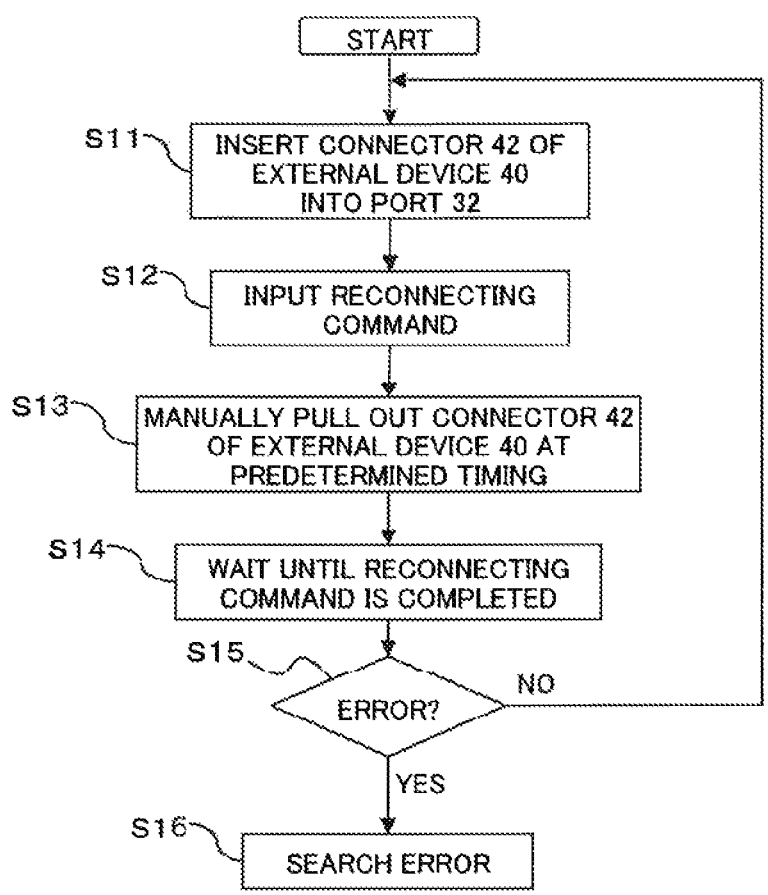
FIG. 12 is a flowchart explaining a procedure when a competition of disconnection processing is caused in the server of FIG. 9.
Figure 13:
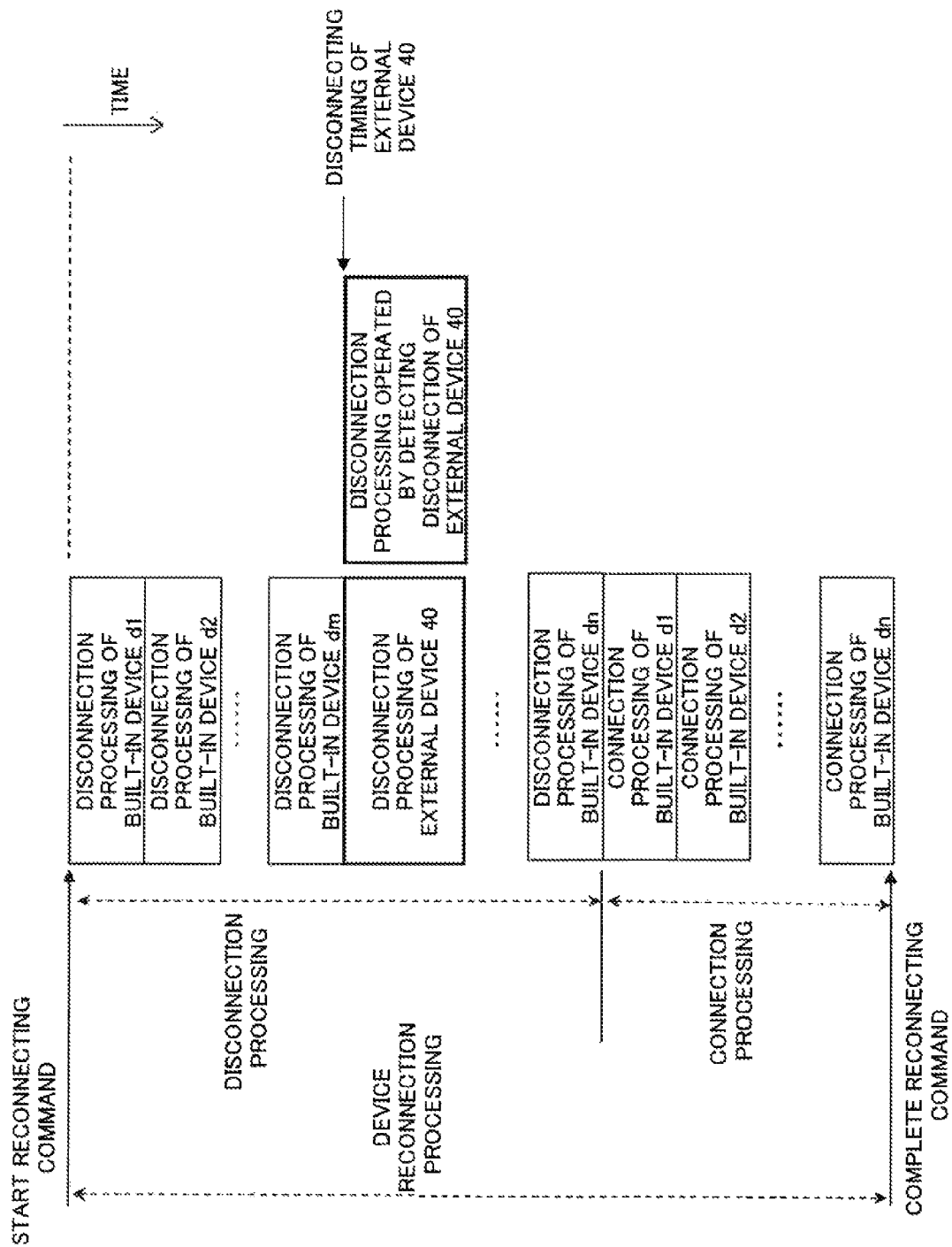
FIG. 13 is a timing chart illustrating a state when the competition of the disconnection processing occurs in the server of FIG. 9.

FIG. 13 is a timing chart illustrating a state when the competition of the disconnection processing occurs in accordance with the processing of step S13 in FIG. 12 during the device reconnection processing by the BIOS 31. In FIG. 13, timings when the device reconnection processing performed in accordance with one reconnecting command and the disconnection processing by the detection of the disconnection of the external device 40 are performed are illustrated.

In accordance with the flowchart (steps S21 to S26) illustrated in FIG. 14, a procedure when the competition of the connection processing is caused during the device reconnection processing by the BIOS 31 will be described.

The operator pulls out the connector 42 of the external device 40 from the port 32 of the server 30 (step S21) and inputs a reconnecting command to the server 30 using the keyboard 34 to allow the BIOS 31 to perform the device reconnection processing (step S22). The operator inputs the reconnecting command and then manually inserts the connector 42 into the port 32 at an appropriate timing when it is considered that the connection processing of the external device 40 is performed during the device reconnection processing (step S23). By doing this, the external device 40 is connected with the server 30.

In association with the connecting manipulation, the BIOS 31 detects the connection of the external device 40 and performs the connection processing of the external device 40. Thereafter, the operator waits until the reconnecting command finishes (step S24) and if there are any errors, for example, hang-up failure occurs (Yes route in step S25), searches errors (step S26).

In the meantime, if no error occurs (No route in step S25), the operator returns to step S21 and repeatedly performs the same processing. In this case, the operator intends to cause the competition of the connection processing and manually connects the external device 40 while varying the timing in step S23. Even when the processing of steps S21 to S24 are repeated predetermined times, if the error does not occur, the operator judges that the error due to the competition of the connection processing does not occur and completes the test.

Figure 14:
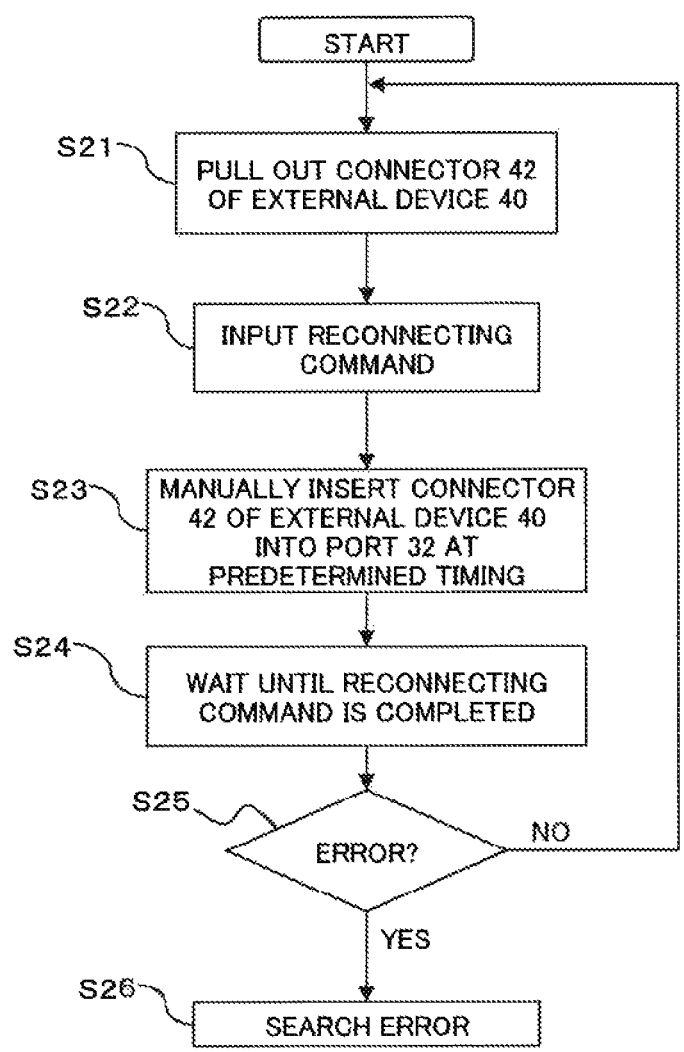
FIG. 14 is a flowchart explaining a procedure when a competition of connection processing is caused in the server of FIG. 9.

FIG. 15 is a timing chart illustrating a state when the competition of the connection processing is caused in accordance with the processing of step S23 in FIG. 14 during the device reconnection processing by the BIOS 31. In FIG. 15, timings when the device reconnection processing performed in accordance with one reconnecting command and the connection processing by the detection of the connection of the external device 40 are performed are illustrated.

Further, in a state when the external device 40 is disconnected from the server 30, the disconnection processing and the connection processing of the external device are not performed during the device reconnection processing. However, as illustrated in FIGS. 14 and 15, in a state when the external device 40 is disconnected from the server 30, if the device reconnection processing starts and the external device 40 is connected with the server 30 at an appropriate timing, the connection processing is performed in accordance with the detection of the connection at a connection timing of the external device 40. Further, in accordance with the detection of the connection, the connection processing of the external device 40 by the reconnecting command is performed in a predetermined order (for example, m-th order).

In the above-mentioned test of the device reconnection processing, even though it is proved whether an error occurs by the result of the command execution (the judging result in steps S15 and S25), whether the competition occurs is not represented by the result of the command execution. However, even though it depends on the performance timing of the connecting/disconnecting manipulation of the operator, as illustrated in FIGS. 13 and 15, the competition of the connection processing or the disconnection processing can be caused during the device reconnection processing. However, in order to guarantee to cause the competition of the connection processing or the disconnection processing, the operator needs to repeat the test for a long time while varying the timing of the connection/disconnection of the external device 40. This is because even though the timing of the competition of the connection processing or the disconnection processing may be estimated in advance, uncertain factors such as the precision of the estimation or the variation of manual timing need to be considered.

Specifically, in the above-mentioned test of the device reconnection processing, since the connector 42 of the external device 40 is manually inserted or pulled out to implement the connection or the disconnection of the external device 40, the variation of the connection or disconnection timing of the external device 40 becomes larger. Therefore, not only is time increased to increase the certainty of the test of the device reconnection processing by the BIOS 31, but time is needed to surely reproduce the failure of the device reconnection processing by the BIOS 31.

[2] Embodiment

[2-1] Configuration of Testing Device

FIG. 1 is a block diagram illustrating a hardware configuration of a testing device 1 according to an embodiment.

The testing device 1 illustrated in FIG. 1 has the device reconnection processing for an built-in device of the server 30 and a device 40 provided outside the server 30, which is performed by the BIOS 31 mounted in the server (apparatus) 30 as to-be-tested processing. Specifically, in the testing device 1, using a testing computer 10 and a connecting/disconnecting mechanism 20 which will be described below, the competition of the disconnection processing/connection processing is implemented. Here, the competition of the disconnection processing/connection processing refers to, as described above, the competition of first disconnection processing/first connection processing of the external device 40 by the device reconnection processing and second disconnection processing/second connection processing which is performed by the BIOS 31 in accordance with the connecting/disconnecting operation of the external device 40.

The testing device 1 includes the testing computer 10 and the connecting/disconnecting mechanism 20.

The connecting/disconnecting mechanism 20 is connected to the testing computer 10 through a control cable 15 which is led from the computer 10. The control cable 15 is, for example, a USB (universal serial bus) cable. By inserting a USB connector 16 of the USB cable 15 into a USB port 24c at the connecting/disconnecting mechanism 20 side, the computer 10 and the connecting/disconnecting mechanism 20 are connected.

Further, the server 30 is connected to the testing computer 10 through a communication cable 17 which is led from the computer 10. The communication cable 17 is, for example, a serial cable. By inserting a serial connector 18 of the serial cable 17 into a serial port 33 at the server 30 side, the computer 10 and the server 30 are connected.

The connecting/disconnecting mechanism 20 is a switch that connects or disconnects the external device 40 to or from the server 30 which performs the device reconnection processing which is to-be-tested processing and interposed between the server 30 and the external device 40 when the device reconnection processing is tested.

In other words, when the device reconnection processing is tested, the server 30 is connected to the connecting/disconnecting mechanism 20 through a connecting cable 21 which is led from the connecting/disconnecting mechanism 20. The connecting cable 21 is, for example, a USB cable. By inserting a USB connector 22 of the USB cable 21 into the USB port 32 at the server 30 side, the connecting/disconnecting mechanism 20 and the server 30 are connected.

Further, when the device reconnection processing is tested, the external device 40 is connected to the connecting/disconnecting mechanism 20 through a connecting cable 41. The connecting cable 41 is, for example, a USB cable and led from the external device 40. By inserting a USB connector 42 of the USB cable 41 into a USB port 23 at the connecting/disconnecting mechanism 20 side, the connecting/disconnecting mechanism 20 and the external device 40 are connected.

Figure 4:
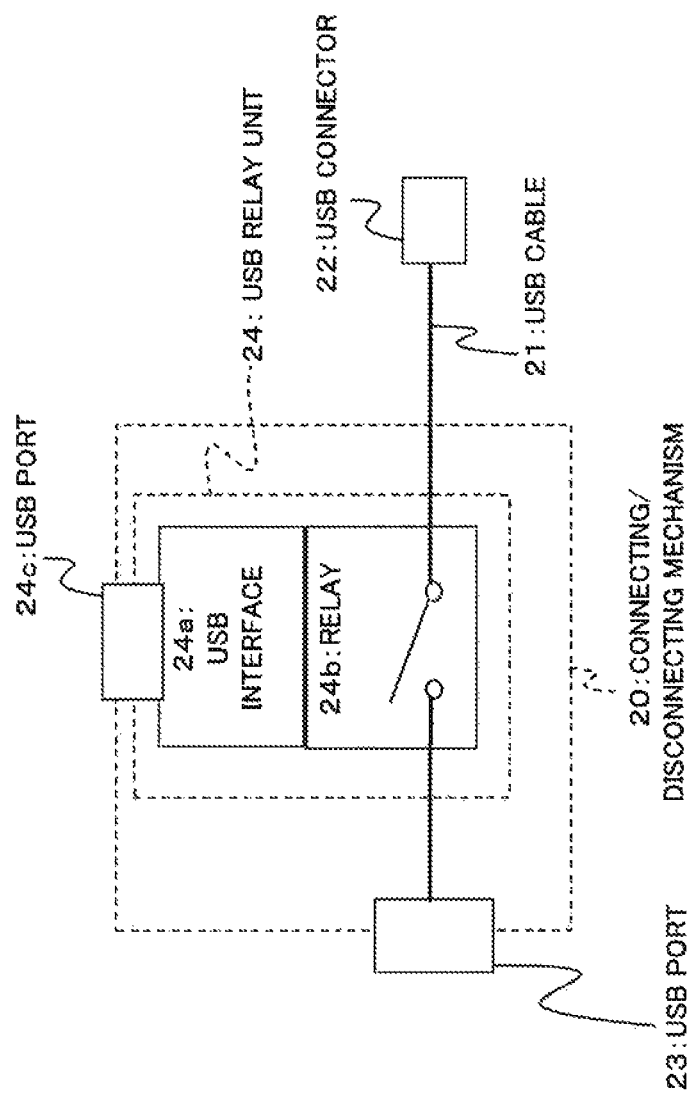
FIG. 4 is a block diagram illustrating a configuration of a connecting/disconnecting mechanism (switch) that configures the testing device illustrated in FIG. 1.

FIG. 4 is a block diagram illustrating a configuration of the connecting/disconnecting mechanism 20 that configures the testing device 1 illustrated in FIG. 1. As illustrated in FIG. 4, the connecting/disconnecting mechanism 20 has a USB relay unit 24 in addition to the above-mentioned USB cable 21, USB connector 22, and USB port 23. The USB relay unit 24 includes a USB interface 24a, a relay 24b, and the USB port 24c. The USB port 24c, as described above, is connected to the computer 10 as the USB connector 16 of the USB cable 15 is inserted into the USB port 24c, and receives the connecting instruction/disconnecting instruction from the computer 10.

One side of the relay 24b is connected to the server 30 through the USB cable 21 and the USB connector 22 and the other side thereof is connected to the external device 40 through the USB port 23. The relay 24b is a mechanism that switches between the connected state and the disconnected state of the server 30 and the external device 40. The USB interface 24a switches the relay 24b into the connected state or the disconnected state in accordance with the connecting instruction/disconnecting instruction received from the computer 10 through the USB port 24c.

In this embodiment, even though it is described that the control cable 15 or the connecting cables 21 and 41 are USB cables and the communication cable 17 is a serial cable. However, the present invention is not limited thereto. For example, when the server 30 has a LAN (local area network) port as the communication port, a LAN cable may be used as the communication cable 17. Further, if the server 30 has an IEEE 1394 port as the connecting port with the external device 40, an IEEE 1394 cable may be used as the connecting cables 21 and 41.

Figure 2:
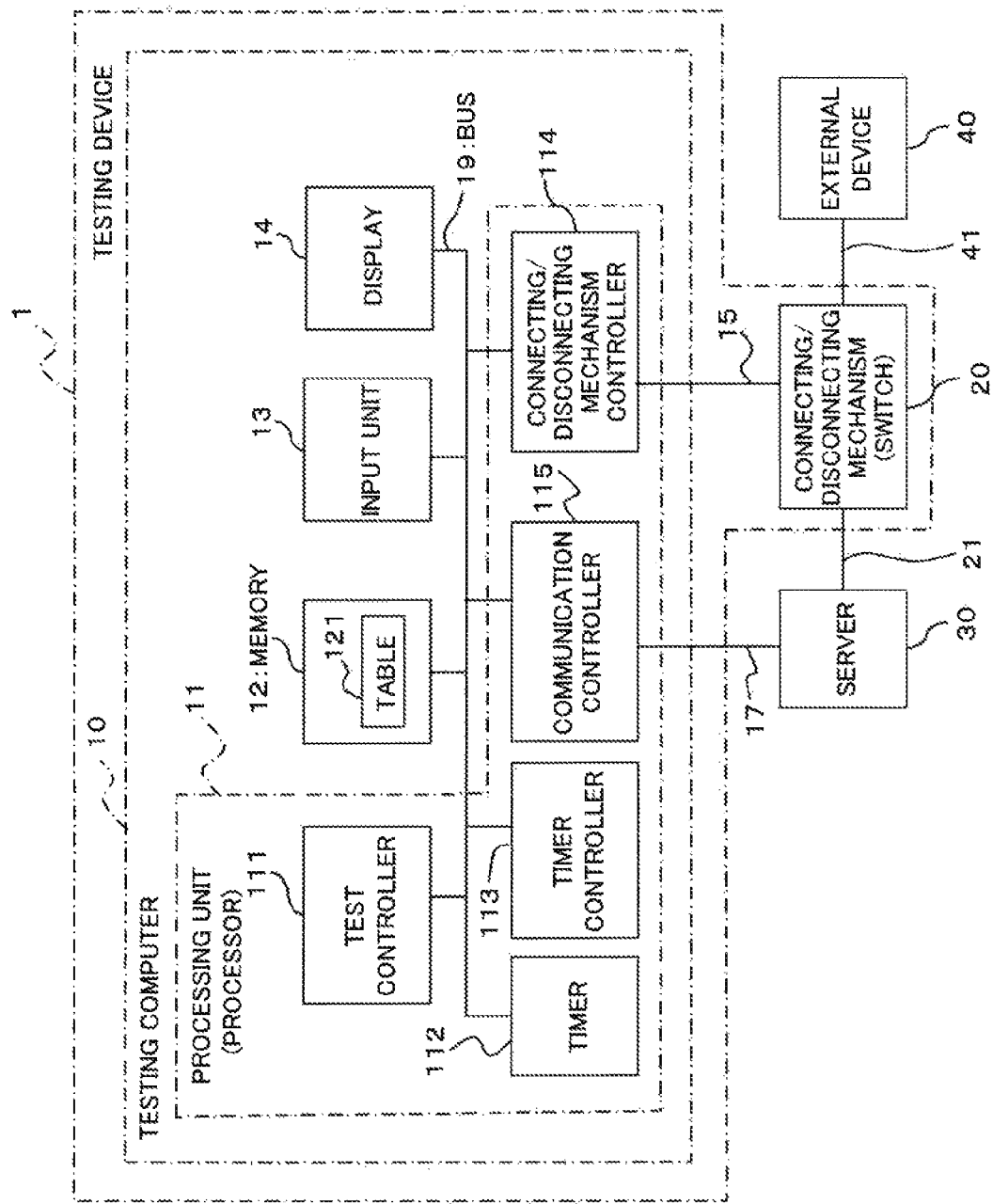
FIG. 2 is a block diagram illustrating a functional configuration of a testing computer that configures the testing device illustrated in FIG. 1.

Next, referring to FIG. 2, a functional configuration of the testing computer 10 will be described. FIG. 2 is a block diagram illustrating a functional configuration of the testing computer 10 that configures the testing device 1 illustrated in FIG. 1.

The computer 10 includes a processing unit 11, a memory 12, an input unit 13, and a display 14. The processing unit 11, the memory 12, the input unit 13, and the display 14 are connected to each other through a bus 19 so as to communicate with each other.

The processing unit 11 is a processor such as a CPU (central processing unit). The processing unit 11 executes a testing program to function as a test controller 111, a timer 112, a timer controller 113, a connecting/disconnecting mechanism controller 114, and a communication controller 115 which will be described below. The processing unit 11 uses the functions to allow the server 30 (BIOS 31) to repeatedly perform the device reconnection processing plural times. Further, the processing unit 11 allows the connecting/disconnecting mechanism 20 to perform the disconnecting operation or the connecting operation at different timings whenever the device reconnection processing is performed in the server 30 to cause the competition of the disconnection processing/connection processing (see FIG. 5 or 6). Here, the disconnecting operation refers to an operation that disconnects the external device 40 from the server 30 by the connecting/disconnecting mechanism 20 and the connecting operation refers to an operation that connects the external device 40 to the server 30 by the connecting/disconnecting mechanism 20.

Figure 3:
FIG. 3 is a view illustrating data which is stored in a table of the testing computer illustrated in FIG. 2.

The memory 12 stores a table 121 which will be described below with reference to FIG. 3 or the testing program. The memory 12 may be an internal storage device such as RAM (random access memory), an HDD (hard disk drive), and an SSD (solid state drive) or an external storage device.

The input unit 13 is such as a keyboard and a mouse that is manipulated by the operator to input various information. The various information input from the input unit 13, for example, is data (which will be described below) set in the table 121 or a value required to calculate the data set in the table 121.

The display 14 displays the various information to notify the information to the operator. The various information displayed on the display 14, for example, is an execution number which will be described below or a testing result (normal completion/error notification) which will be described below.

The test controller 111 controls the timer controller 113, the connecting/disconnecting mechanism controller 114, and the communication controller 115 to test the device reconnection processing by the BIOS 31 mounted in the server 30 which will be described below with reference to FIGS. 5 to 8. When the test controller 111 allows the server 30 to perform the device reconnection processing, the test controller 111 controls the communication controller 115 to transmit a reconnecting command to the server 30.

The timer 112 is controlled by the timer controller 113 and a timing value is set by the timer controller 113. The timer 112 starts to measure the time when the communication controller 115 transmits the reconnecting command to the server 30 and measures the time corresponding to the set timing value.

The timer controller 113 is controlled by the test controller 111 to control the timer 112. The timer controller 113 sets different timing values to the timer 112 for every device reconnection processing and after setting the timing value, if the communication controller 115 transmits the reconnecting command to the server 30, allows the timer 112 to start to measure the time. If the timer 112 completes to measure the time corresponding to the timing value, the timer controller 113 notifies the completion to the test controller 111. If the notification of the completion of the time measurement is received, the test controller 111 controls the connecting/disconnecting mechanism controller 114 to allow the connecting/disconnecting mechanism 20 to perform the disconnecting operation or the connecting operation.

The connecting/disconnecting mechanism controller 114 is controlled by the test controller 111 to control the connecting operation/switching operation by the connecting/disconnecting mechanism 20 through the USB cable 15 in response to the instruction from the test controller 111.

The communication controller 115 is controlled by the test controller 111 and performs communication between the computer 10 and the server 30 through the serial cable 17. The communication controller 115 transmits the reconnecting command from the computer 10 to the server 30 in response to the instruction from the test controller 111.

The test controller 111 records and updates data (constant number or variables) required to control the test in the table 121 of the memory 12 and controls the testing of the device reconnection processing with reference to the data of the table 121. Here, data stored in the table 121 will be described with reference to FIG. 3. The data stored in the table 121 is, for example, as illustrated in FIG. 3, a specified number of times, a timing value, a time increment, and a performance number. These values may be input from the input unit 13 by the operator or calculated in the computer 10 based on the value input from the input unit 13 by the operator.

"The specified number of times" refers to the number of times when the device reconnecting processing is repeatedly performed, that is, the number of times when the connecting operation or the disconnecting operation of the external device 40 is performed. A value of the specified number of times is a constant value which is given before testing. The specified number of times is given by the number of times of performance y which will be described below.

"The performance number" refers to a number for distinguishing the repeatedly performed device reconnection processing and is a variable which is set to 1 as an initial value and is increased by 1 whenever the device reconnection processing is performed.

"The time increment" refers to the increment of the timing value and has a constant value which is given before testing. The time increment is represented by k which will be described below.

"The timing value" refers to a waiting time from the issuance of the reconnecting command to the connection or disconnection of the external device 40. As the timing value, an initial time is given before testing and a value obtained by adding the time increment to the timing used recently value whenever the device reconnection processing (connecting/disconnecting operation of the external device 40) is performed is set. Further, as the initial time, two kinds, that is, an initial time Td for disconnection processing which will be described below and an initial time Tc for connection processing which will be described below are set.

[2-2] Operation of Testing Device

Next, a specific operation of the testing device 1 according to the embodiment configured as described above will be described with reference to FIGS. 5 to 8.

Figure 5:
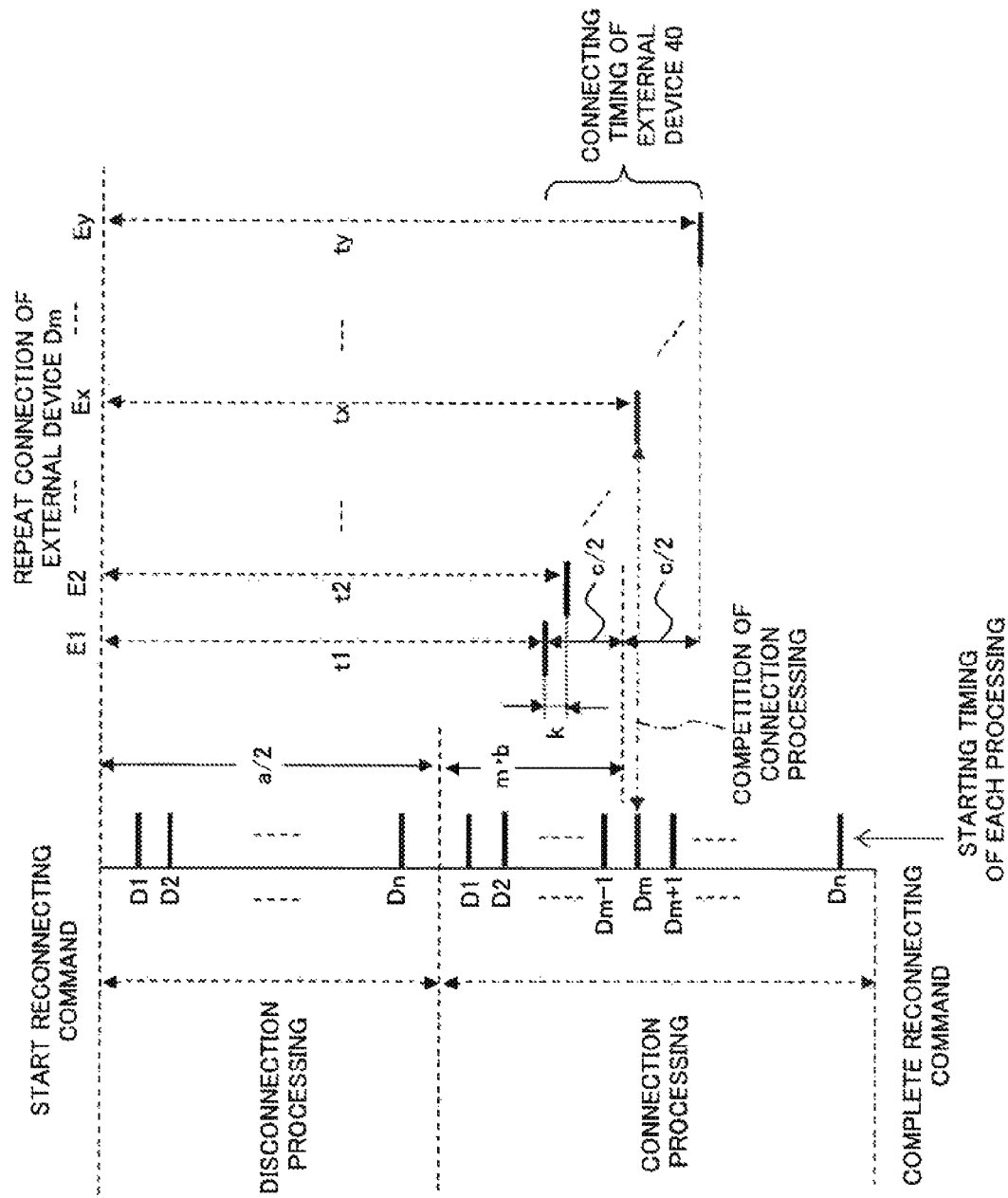
FIG. 5 is a timing chart illustrating a procedure when a competition of connection processing is caused by the testing device according to the embodiment.
Figure 6:
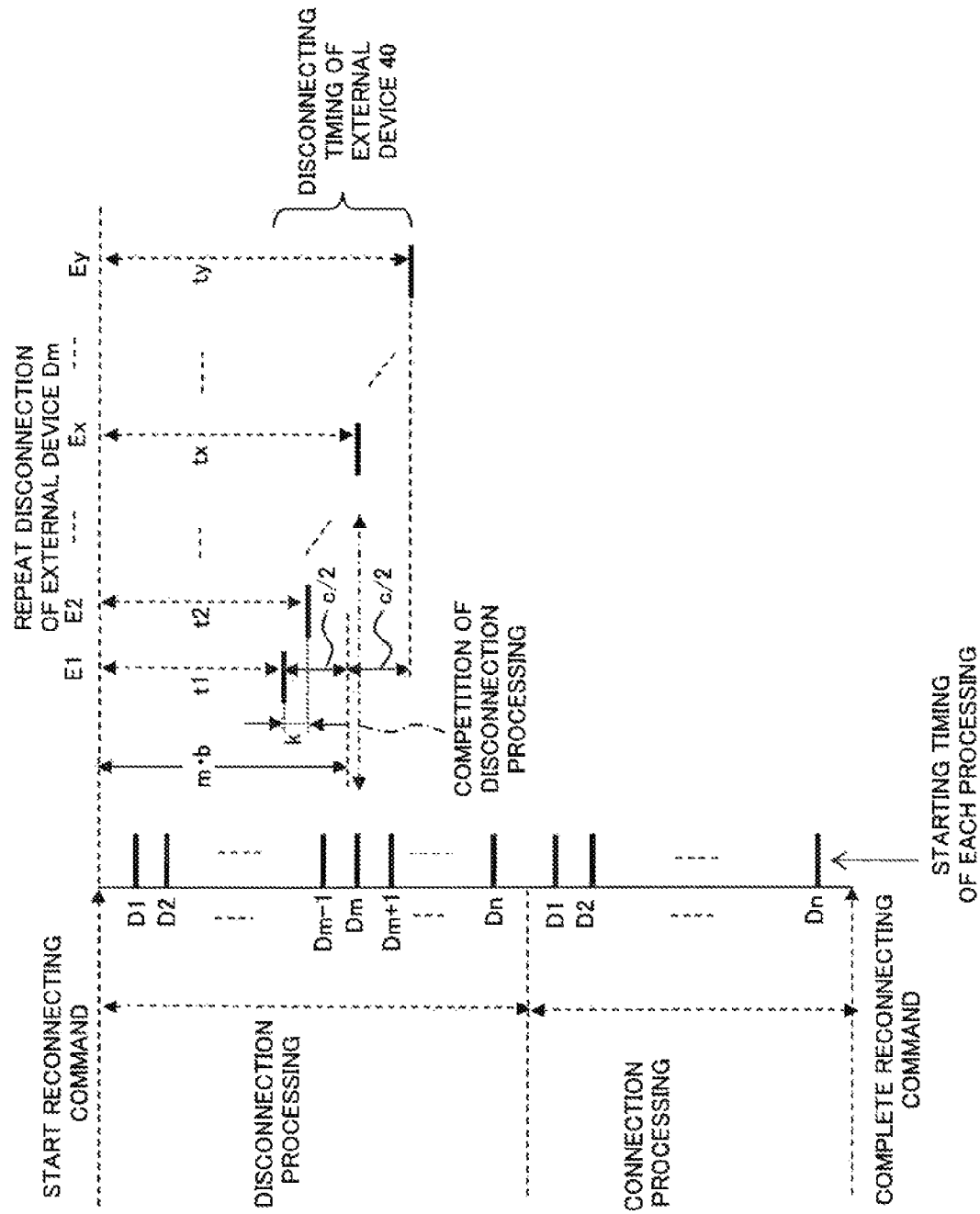
FIG. 6 is a timing chart illustrating a procedure when a competition of disconnection processing is caused by the testing device according to the embodiment.

FIG. 5 is a timing chart illustrating a procedure when the competition of the connection processing is caused by connecting the external device 40 by a switch 20 in the testing device 1 according to the embodiment. FIG. 6 is a timing chart illustrating a procedure when the competition of the disconnection processing is caused by disconnecting the external device 40 by the switch 20 in the testing device 1 according to the embodiment.

Here, in FIGS. 5 and 6, reference symbols D1 to Dm−1 and Dm+1 to Dn denote built-in devices of the server 30, a reference symbol Dm denotes the external device 40, and reference symbols t1 to ty denote the connection or disconnection timing (timing value) of the external device 40. As illustrated in FIG. 5, when the competition of the connection processing is caused, before testing, y (a natural number which is 2 or larger) is given to the table 121 as the specified number of times, an initial time Tc for connection processing is given as the initial timing value t1, and k is given as the time increment. Further, as illustrated in FIG. 6, when the competition of the disconnection processing is caused, before testing, y is given to the table 121 as the specified number of times, an initial time Td for disconnection processing is given as the initial timing value t1, and k is given as the time increment.

In first to y-th tests E1 to Ey illustrated in FIG. 5, the following processing is performed. In the first test E1, in the state when the external device 40 is disconnected from the server 30, at a time having passed by a timing t1(=Tc) since starting of the device reconnection processing, the external device 40 is connected to the server 30 by the switch 20. In the second test E2, in the state when the external device 40 is disconnected from the server 30, at a time having passed by a timing t2(=Tc+k) since starting of the device reconnection processing, the external device 40 is connected to the server 30 by the switch 20. Similarly, in the x-th test Ex, in the state when the external device 40 is disconnected from the server 30, at a time having passed by a timing tx(=Tc+k−(x−1)) since starting of the device reconnection processing, the external device 40 is connected to the server 30 by the switch 20. Here, x is a natural number which is smaller than y. The repetition of the test is completed at the time when an error occurs by the occurrence of the competition of the connection processing or when the test is repeated the specified number of times y.

Here, in the test illustrated in FIG. 5, the initial time Tc, the time increment k, and the specified number of times y for surely causing the competition of the connection processing are calculated and determined as described below and set in the table 121. Further, the initial time Tc, the time increment k, and the specified number of times y may be input from the input unit 13 by the operator or calculated by the computer 10.

n is a sum of the number of built-in devices and the number of external device 40 (n is a natural number which is 2 or larger) in the server 30. In this embodiment, the number of external device 40 is 1.

m is the performing order of the disconnection processing of the external device 40 in the device reconnection processing (m is a natural number and 1<m<n). The m which indicates the performing order indicates the position of the external device 40 (Dm) counted from the device D1 in the device tree of the server 30.

a is an actual measured value (second) of a processing time required for the device reconnection processing.

b is an estimated value (second) of the processing time required for the disconnection processing or the connection processing per device in the device reconnection processing. The estimated value b of the processing time is obtained by $b=a/(n\times 2)$.

c is a time duration (estimated duration) that indicates the time interval to be tested (second; $b<c<a$).

In this case, the initial time Tc for connection processing is obtained by:

$Tc=m\times b-c/2+a/2$ (second), and the time increment k is obtained by:

$k=b/2$ (a value of 2 or larger) (second). Further, if Tc which is calculated by the above equation is a negative value, Tc=0.

Further, the number of times of performing the device reconnection processing y is obtained by $y=c/k$. However, if c/k is not an integer, a value of an integer part of c/k or a value of an integer part of c/k plus 1 is used as the number of times of performance y.

The initial time Tc, the time increment k, and the number of times of performance y for connection processing calculated and determined as described above are stored in the table 121 and the test as illustrated in FIG. 5 is repeated. By doing this, within the time duration c based on a timing (a/2+m×b) when it is considered that the connection processing of the external device 40 is performed during the device reconnection processing, the connection processing which is accompanied by the connecting operation of the external device 40 is performed every time increment k which is half or less than the processing time b per device. Therefore, as illustrated in FIG. 5, it is possible to surely cause the competition of the connection processing.

In each of the first to y-th tests E1 to Ey illustrated in FIG. 6, the following processing is performed. In the first test E1, in the state when the external device 40 is connected to the server 30, at a time having passed by a timing t1(=Td) since starting of the device reconnection processing, the external device 40 is disconnected from the server 30 by the switch 20. In the second test E2, in the state when the external device 40 is connected to the server 30, at a time having passed by a timing t2(=Td+k) since starting of the device reconnection processing, the external device 40 is disconnected from the server 30 by the switch 20. Similarly, in the x-th test Ex, in the state when the external device 40 is connected to the server 30, at a time having passed by a timing tx(=Td+k·(x−1)) since starting of the device reconnection processing, the switch 20 allows the external device 40 to be connected to the server 30. The repetition of the test is completed at the time when an error occurs by the occurrence of the competition of the disconnection processing or when the test is repeated the specified number of times y.

Here, in the test illustrated in FIG. 6, the initial time Td, the time increment k, and the specified number of times y for surely causing the competition of the disconnection processing are calculated and determined as described below and set in the table 121. Further, the initial time Td, the time increment k, and the specified number of times y may be input from the input unit 13 by the operator or calculated by the computer 10. Here, values n, m, a, b, and c are the same as the above and thus the description thereof will be omitted. Furthermore, the time increment k and the specified number of times y are calculated and determined similarly to the above description and thus the description thereof will be omitted.

In this case, the initial time Td for disconnection processing is obtained by:

Td=m×b−c/2 (second). Further, if the Td calculated by the above equation is a negative value, Td=0.

The initial time Td, the time increment k, and the number of times of performance y for disconnection processing calculated and determined as described above are stored in the table 121 and the test as illustrated in FIG. 6 is repeated. By doing this, within the time duration c having a timing (m×b) when it is considered that the disconnection processing of the external device 40 which is accompanied by the disconnecting operation of the external device 40 is performed during the device reconnection processing as a center, the disconnection processing in association with the disconnection processing of the external device 40 is performed every time increment k which is half or less than the processing time b per device. Therefore, as illustrated in FIG. 6, it is possible to surely cause the competition of the disconnection processing.

Figure 7:
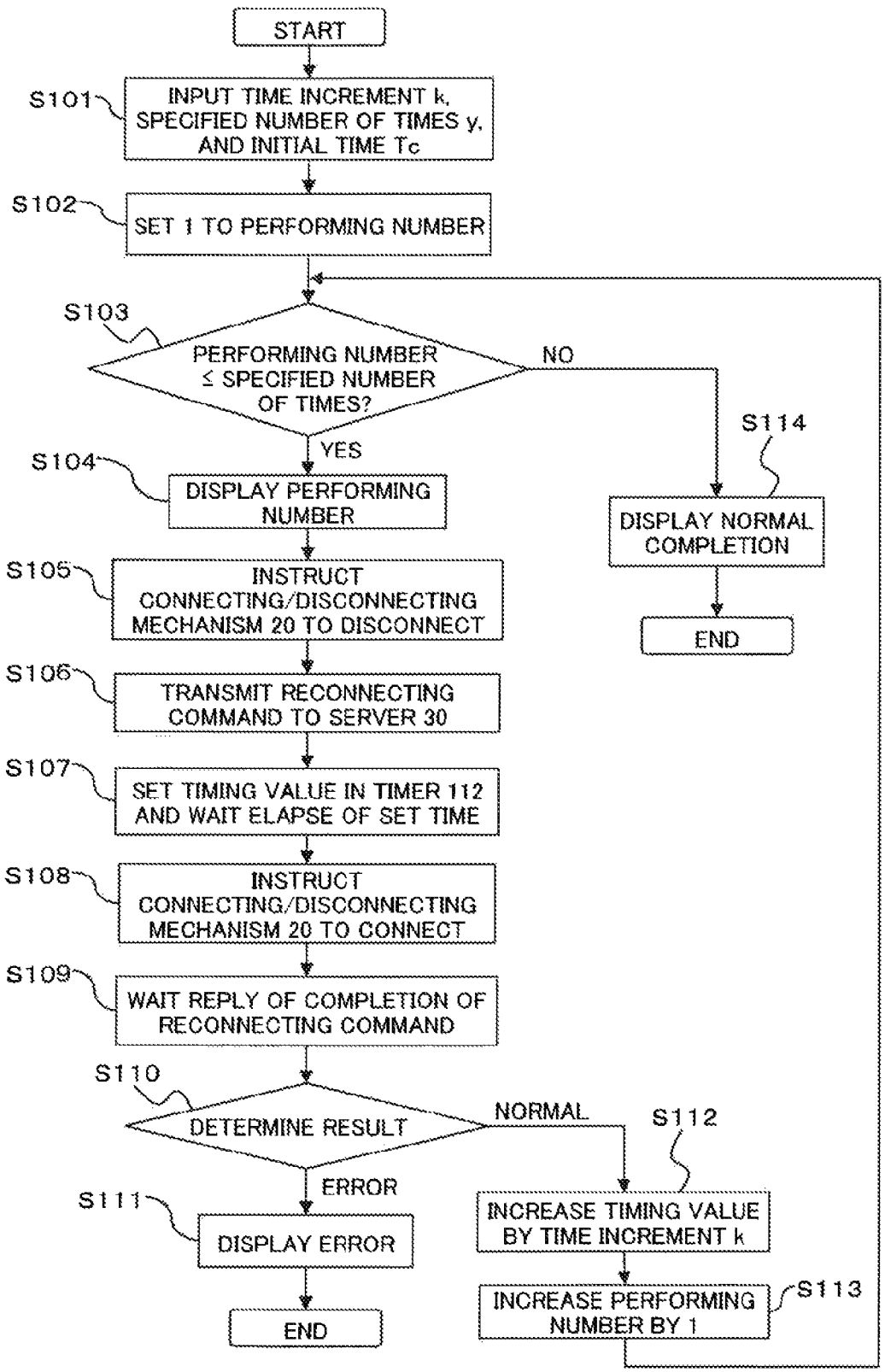
FIG. 7 is a flowchart explaining an operation of a testing computer when a competition of the connection processing is caused by the testing device according to the embodiment.

Next, an operation of the testing computer 10 when the competition of the connection processing is caused by the testing device 1 according to the embodiment in accordance with the flowchart (steps S101 to S114) illustrated in FIG. 7 will be described. In other words, the testing computer 10 creates a connection timing of the external device 40 and the server 30 whenever the device reconnection processing is performed and controls the connecting/disconnecting mechanism to perform the connecting operation of the external device 40 and the server 30. Therefore, the connection of the external device 40 and the server 30 does not need to be manually performed.

First, the operator inputs the time increment k, the specified number of times y, and the initial time Tc for connection processing determined as described above from the input unit 13 and stores them in a predetermined field of the table 121 in the memory 12 (step S101). In this case, the operator may input, for example, the values n, m, and a from the input unit 13 and calculate and determine the time increment k, the specified number of times y, and the initial time Tc for connection processing in the computer 10 based on the values n, m, and a to store them in the table 121.

The test controller 111 stores the initial value 1 in the performing number field of the table 121 (step S102). Then, the test controller 111 compares the contents of the performing number field with the contents of the specified number of times field and determines whether the performing number is smaller than the specified number of times y (step S103).

If the performing number exceeds the specified number of times y (No route in step S103), the test controller 111 allows the display 14 to display that the test is normally completed (step S114) and completes the test. In other words, the test controller 111 notifies the operator through the display 14 that the testing of the device reconnection processing is normally completed without the competition error accompanied by the connecting operation by the connecting/disconnecting mechanism 20 in the server 30.

If the performing number is smaller than the specified number of times y (Yes route in step S103), the test controller 111 allows the display 14 to display the current performing number to notify the operator of the current performing number (step S104). The test controller 111 instructs the connecting/disconnecting mechanism 20 to disconnect the external device 40 through the connecting/disconnecting mechanism controller 114 (step S105) to separate the external device 40 from the server 30. Thereafter, the test controller 111 transmits the reconnecting command to the server 30 through the communication controller 115 (step S106).

The test controller 111 sets the timing value which is read from the table 121 to the timer 112 through the timer controller 113 simultaneously or almost simultaneously with the transmission of the reconnecting command or immediately after transmission and waits the elapse of the time corresponding to the timing value (step S107). The timing value is the initial time Tc for the connection processing when the performing number is 1 (x=1). When the performing number is 2 to y, the timing value is a value obtained by adding the time increment k to the timing value used recently (see FIG. 5 and step S112).

After executing the reconnecting command, that is, after starting the device reconnection processing, if the timer 112 measures and detects the elapse of the time corresponding to the timing value, the test controller 111 instructs the connecting/disconnecting mechanism 20 to connect the external device 40 through the connecting/disconnecting mechanism controller 114 (step S108). Then, the test controller 111 waits the notification of the completion of the reconnecting command (device reconnection processing) from the server 30 through the communication controller 115 (step S109).

If the test controller 111 receives the notification of the completion from the server 30, the test controller 111 determines the result of the device reconnection processing (step S110). In the device reconnection processing, if an error such as hang-up occurs in the server 30 ("error" in step S110), the test controller 111 allows the display 14 to display that an error occurs (step S111) and completes the test. In other words, the test controller 111 notifies the operator through the display 14 that the competition error accompanied by the connecting operation by the connecting/disconnecting mechanism 20 occurs in the server 30.

In the meantime, when the device reconnection processing is normally completed ("normal" in step S110), the test controller 111 reads out the timing value and the time increment k from the table 121 and overwrites and stores a value obtained by adding the time increment k to the read timing value in the table 121 as a next timing value (step S112). Further, the test controller 111 reads out the performing number from the table 121 and overwrites and stores a value obtained by adding 1 to the read performing number in the table 121 as a next timing value (step S113). Thereafter, the test controller 111 returns to the processing of step S103 and repeats the same processing until it is determined as NO in step S103 or it is determined that an error occurs in step S110. When processing in the steps S103 to S113 are repeated until it is determined as NO in step S103, the tests E1 to Ey illustrated in FIG. 5 are performed.

Figure 8:
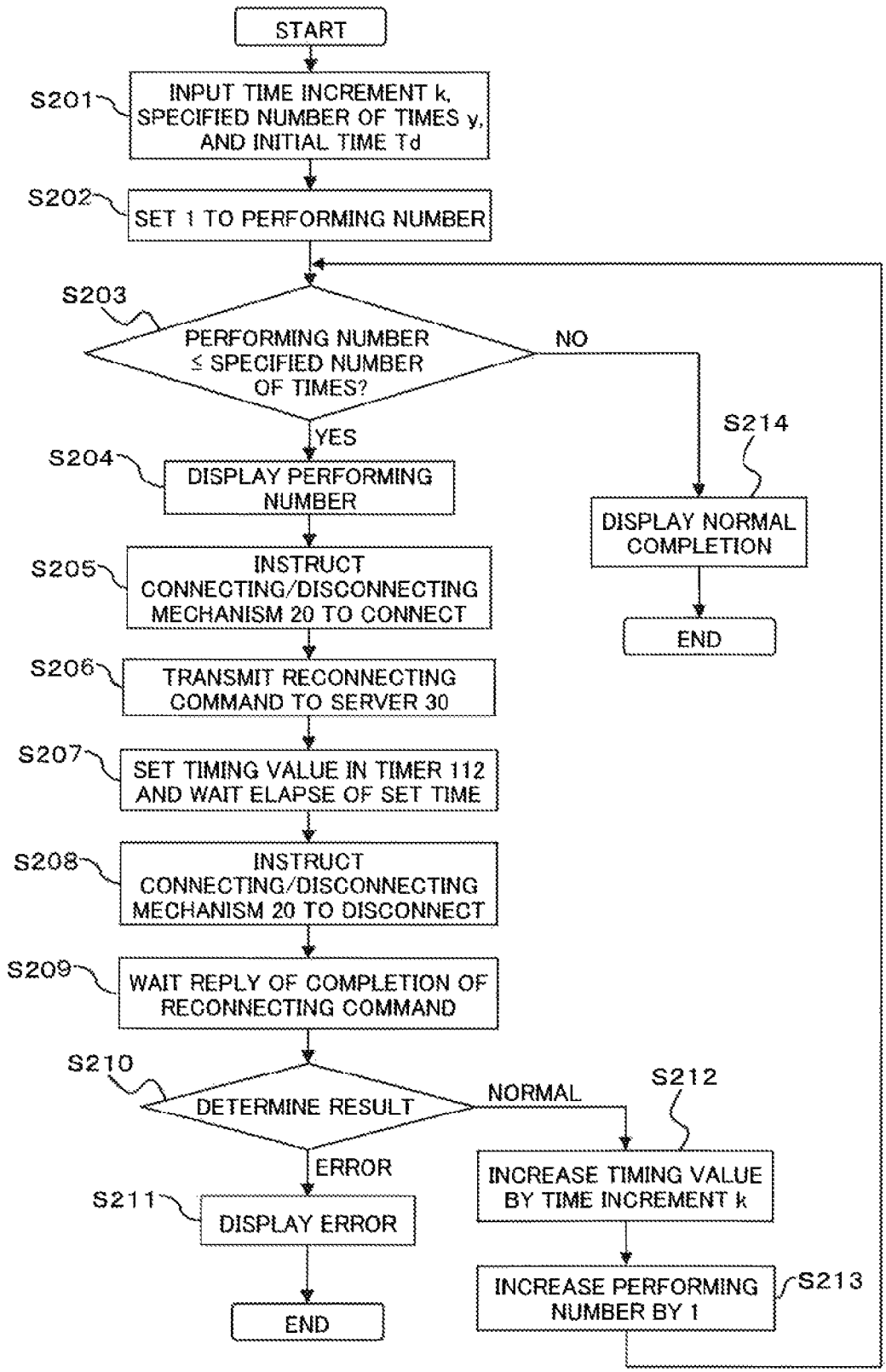
FIG. 8 is a flowchart explaining an operation of a testing computer when a competition of the disconnection processing is caused by the testing device according to the embodiment.
Figure 9:
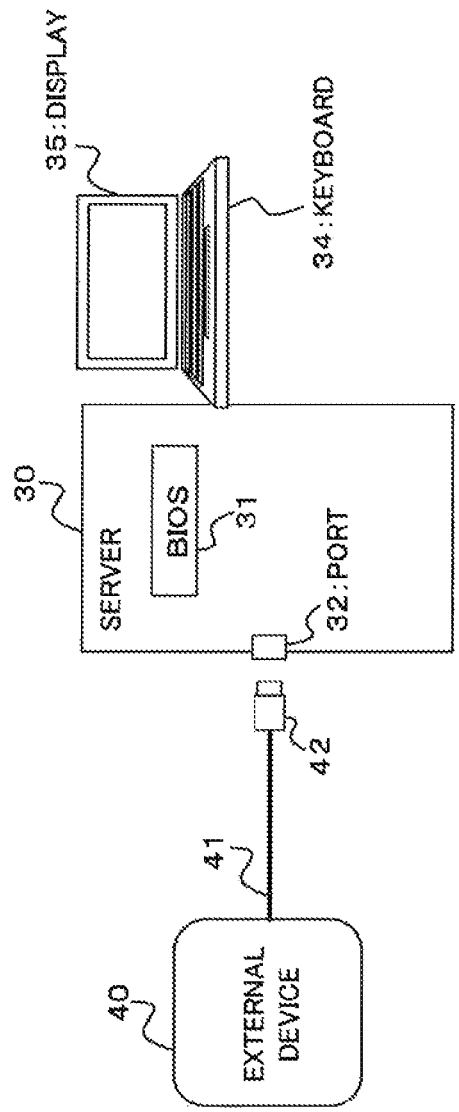
FIG. 9 is a block diagram illustrating a configuration of a server that is connected with an external device.
Figure 10:
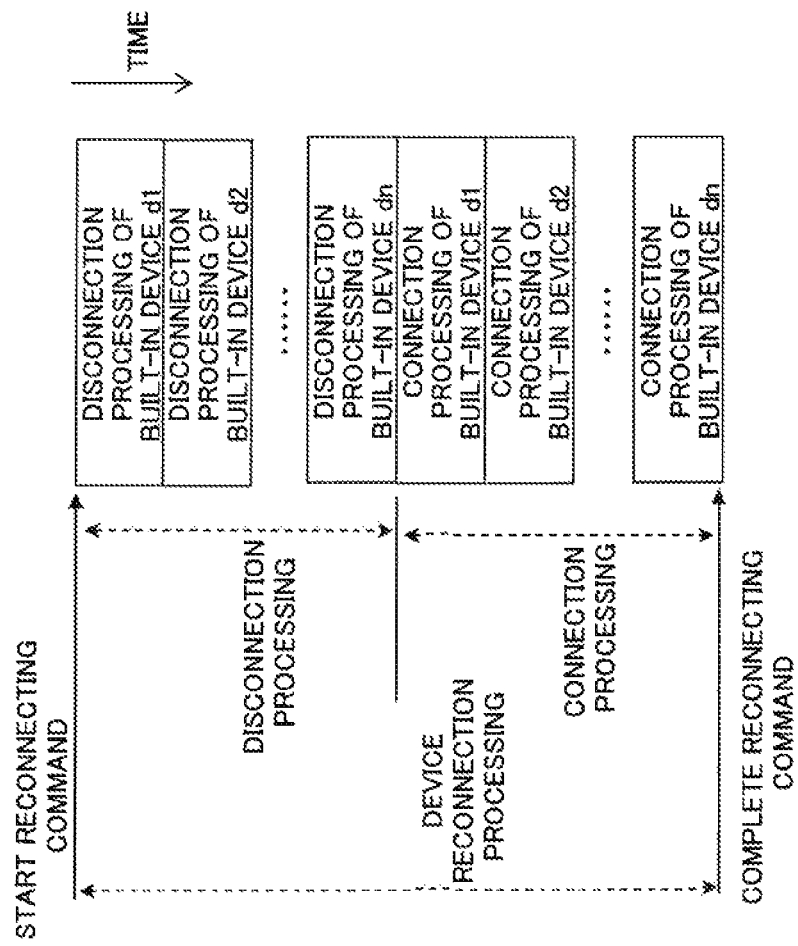
FIG. 10 is a timing chart explaining a procedure of device reconnection processing by a BIOS in a server having n built-in devices.
Figure 11:
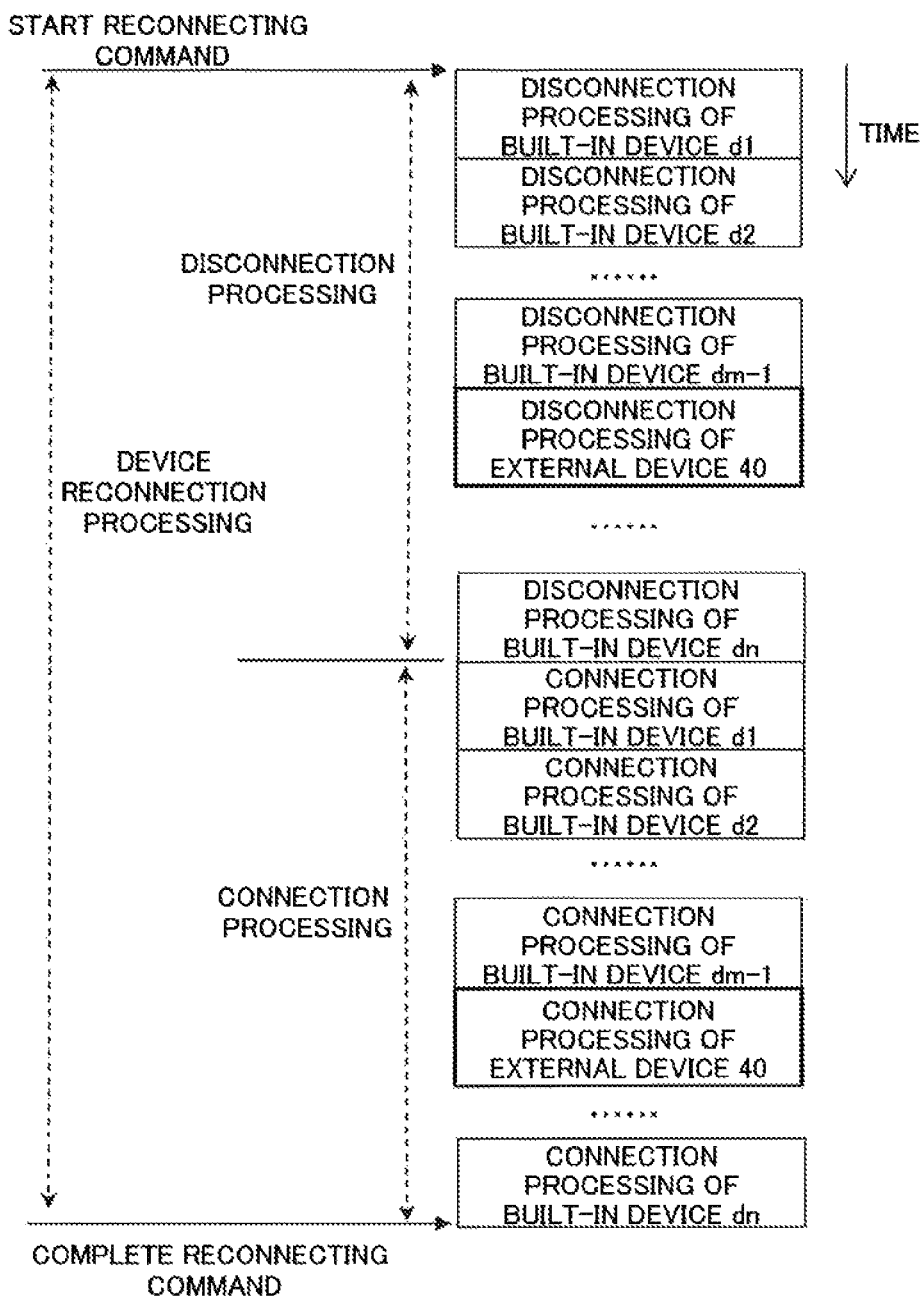
FIG. 11 is a timing chart explaining a procedure of the device reconnection processing by a BIOS in a server that has a built-in device and is connected with an external device in advance.

Next, an operation of the testing computer 10 when the competition of the disconnection processing is caused by the testing device 1 according to the embodiment in accordance with the flowchart (steps S201 to S214) illustrated in FIG. 8 will be described. In other words, the testing computer 10 creates a disconnection timing of the external device 40 and the server 30 whenever the device reconnection processing is performed and controls the connecting/disconnecting mechanism 20 to perform the disconnecting operation of the external device 40 and the server 30. Therefore, the disconnection of the external device 40 and the server 30 does not need to be manually performed.

First, the operator inputs the time increment k, the specified number of times y, and the initial time Td for disconnection processing determined as described above from the input unit 13 and stores them in a predetermined field of the table 121 in the memory 12 (step S201). In this case, the operator may input, for example, the values n, m, and a from the input unit 13 and calculate and determine the time increment k, the specified number of times y, and the initial time Td for disconnection processing in the computer 10 based on the values n, m, and a to store them in the table 121.

The test controller 111 stores the initial value 1 in the performing number field of the table 121 (step S202). Then, the test controller 111 compares the contents of the performing number field with the contents of the specified number of times field and determines whether the performing number is smaller than the specified number of times y (step S203).

If the performing number exceeds the specified number of times y (No route in step S203), the test controller 111 allows the display 14 to display that the test is normally completed (step S214) and completes the test. In other words, the test controller 111 notifies the operator through the display 14 that the test of the device reconnection processing is normally completed without the competition error accompanied by the disconnecting operation by the connecting/disconnecting mechanism 20 in the server 30.

If the performing number is smaller than the specified number of times y (Yes route in step S203), the test controller 111 allows the display 14 to display the current performing number to notify the operator of the current performing number (step S204). The test controller 111 instructs the connecting/disconnecting mechanism 20 to connect the external device 40 through the connecting/disconnecting mechanism controller 114 (step S205) to connect the external device 40 with the server 30. Thereafter, the test controller 111 transmits the reconnecting command to the server 30 through the communication controller 115 (step S206).

The test controller 111 sets the timing value which is read from the table 121 to the timer 112 through the timer controller 113 simultaneously or almost simultaneously with the transmission of the reconnecting command or immediately after transmission and waits the elapse of the time corresponding to the timing value (step S207). The timing value is the initial time Td for the disconnection processing when the performing number is 1 (x=1). When the performing number is 2 to y, the timing value is a value obtained by adding the time increment k to the timing value used recently (see FIG. 6 and step S212).

After executing the reconnecting command, that is, after starting the device reconnection processing, if the timer 112 measures and detects the elapse of the time corresponding to the timing value, the test controller 111 instructs the connecting/disconnecting mechanism 20 to disconnect the external device 40 through the connecting/disconnecting mechanism controller 114 (step S208). Then, the test controller 111 waits the notification of the completion of the reconnecting command (device reconnection processing) from the server 30 through the communication controller 115 (step S209).

If the test controller 111 receives the notification of the completion from the server 30, the test controller 111 determines the result of the device reconnection processing (step S210). In the device reconnection processing, if an error such as hang-up occurs in the server 30 ("error" in step S210), the test controller 111 allows the display 14 to display that an error occurs (step S211) and completes the test. In other words, the test controller 111 notifies the operator through the display 14 that the competition error accompanied by the connecting operation by the connecting/disconnecting mechanism 20 occurs in the server 30.

In the meantime, when the device reconnection processing is normally completed ("normal" in step S210), the test controller 111 reads out the timing value and the time increment k from the table 121 and overwrites and stores a value obtained by adding the time increment k to the read timing value in the table 121 as a next timing value (step S212). Further, the test controller 111 reads out the performing number from the table 121 and overwrites and stores a value obtained by adding 1 to the read performing number in the table 121 as a next timing value (step S213). Thereafter, the test controller 111 returns to the processing of step S203 and repeats the same processing until it is determined as NO in step S203 or it is determined that an error occurs in step S210. When the processing in the steps S203 to S213 are repeated until it is determined as NO in step S203, the tests E1 to Ey illustrated in FIG. 6 are performed.

According to the above-mentioned testing device 1 of the embodiment, the external device 40 and the server 30 are connected or disconnected using the connecting/disconnecting mechanism 20 which is controlled by the testing computer 10. Therefore, it is not required to manually insert or pull out the connector 42 of the external device 40. Further, the connection or disconnection timing of the external device 40 and the server 30 is created by the testing computer 10 so that there is no variation in the connection or disconnection timing of the external device 40.

If the variation in the connection or disconnection timing of the external device 40 is large, in order to increase the certainty of the test of the device reconnection processing by the BIOS 31, it takes time to test the device reconnection processing. In contrast, according to the testing device 1 of the embodiment, there is no variation in the connection or disconnection timing of the external device 40 as described above. Further, it is possible to surely cause the competition of the connection processing or the disconnection processing during the testing of the device reconnection processing. Therefore, it is possible to test the device reconnection processing with a higher certainty for a short time. Similarly, it is possible to surely reproduce the failure of the device reconnection processing by the BIOS 31, that is, reproduce the competition of the connection processing or the disconnection processing for a short time.

Further, within a predetermined time duration c having a timing when it is considered that the connection processing of the external device 40 is performed during the device reconnection processing as a center, the connection processing which is accompanied by the connecting operation of the external device 40 is performed every predetermined time increment k. In this case, as the predetermined time increment, for example, a time (b/(a value of 2 or larger)) which is half or less than the processing time b per device is set. By doing this, it is possible to surely cause the competition of the connection processing of the external device 40 by the reconnecting command and the connection processing of the external device 40 which is accompanied by the detection of the connecting operation of the external device 40.

Similarly, within a predetermined time duration c having a timing when it is considered that the disconnection processing of the external device 40 is performed during the device reconnection processing as a center, the disconnection processing which is accompanied by the disconnecting operation of the external device 40 is performed every predetermined time increment k. In this case, as the predetermined time increment, for example, a time (b/(a value of 2 or larger)) which is half or less than the processing time b per device is set. By doing this, it is possible to surely cause the competition of the disconnection processing of the external device 40 by the reconnecting command and the disconnection processing of the external device 40 which is accompanied by the detection of the disconnecting operation of the external device 40.

[3] Others

Even though the preferred embodiment of the present invention has been described in detail, the present invention is not limited to a specific embodiment but various modification or changes may be allowed within the scope without departing from the spirit of the present invention.

For example, even though it is described that the to-be-tested processing is device reconnection processing, the present invention is not limited thereto.

All or a part of the above-mentioned functions as the test controller 111, the timer 112, the timer controller 113, the connecting/disconnecting mechanism controller 114, and the communication controller 115 may be implemented by allowing a computer (including a CPU, an information processing device, or various terminals) to execute a predetermined application program (testing program).

The program, for example, is provided so as to be recorded in a computer-readable recording medium such as a flexible disc, a CD (CD-ROM, CD-R, or CD-RW), a DVD (DVD-ROM, DVD-RAM, DVD-R, DVD-RW, DVD+R, or DVD+RW), or a Blue-ray disc. In this case, the computer reads out the program from the recording medium to transmit and store the program to an internal storage device or an external storage device to be used.

Here, the computer is a concept including hardware and an OS (operating system) and refers to a hardware which operates under the control of the OS. Further, if the application program solely operates the hardware without requiring the OS, the hardware corresponds to the computer. The hardware includes at least a micro processor such as a CPU and a unit that reads out the computer program recorded in the recording medium. The testing program includes in the computer as described above a program code that implements the functions of the test controller 111, the timer 112, the timer controller 113, the connecting/disconnecting mechanism controller 114, and the communication controller 115. Further, a part of the functions may be implemented by the OS rather than the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A testing device, comprising:
   a switch that connects or disconnects a device to or from an apparatus that performs to-be-tested processing; and
   a processor,
   wherein the processor allows the apparatus to repeatedly perform the to-be-tested processing plural times, and allows the switch to once perform a disconnecting operation that disconnects the device from the apparatus or a connecting operation that connects the device to the apparatus, at different timings whenever the to-be-tested processing is performed in the apparatus.

2. The testing device according to claim 1, further comprising:
   a memory that stores an initial time and a time increment that define a timing of performing the disconnecting operation or the connecting operation by the switch during the each to-be-tested processing,
   wherein the processor uses the initial time as a timing of performing the disconnecting operation or the connecting operation by the switch during first to-be-tested processing, and uses a time obtained by adding the timing used recently and the time increment as a timing of performing the disconnecting operation or the connecting operation by the switch during second or later to-be-tested processing.

3. The testing device according to claim 2, wherein when an error occurs in the apparatus in association with the disconnecting operation or the connecting operation by the switch, the processor notifies the error and completes to perform the to-be-tested processing by the apparatus.

4. The testing device according to claim 2, wherein the memory stores the number of times of performing the to-be-tested processing, and
   when the to-be-tested processing is performed the number of times stored in the memory without causing an error in association with the disconnecting operation or the connecting operation by the switch in the apparatus, the processor notifies that the test of the to-be-tested processing is normally completed.

5. The testing device according to claim 2, wherein
the to-be-tested processing is device reconnection processing for built-in devices of the apparatus and the device which is provided outside the apparatus, the device reconnection processing being performed by a BIOS (basic input output system) of the apparatus, and
the processor performs the disconnecting operation or the connecting operation by the switch at different timings for every to-be-tested processing so that first disconnection processing or first connection processing of the device by the device reconnection processing competes against second disconnection processing or second connection processing which is performed by the BIOS in association with the disconnecting operation or the connecting operation by the switch in the apparatus.

6. The testing device according to claim 5, wherein in the device reconnection processing, when the connection processing of all the built-in devices and the device is performed after performing the disconnection processing of all the built-in devices and the device, when a sum of the number of built-in devices and the number of device is n (n is a natural number which is 2 or larger), the performing order of the first disconnection processing of the device in the device reconnection processing is m-th (m is a natural number and $1<m<n$), a processing time required for the device reconnection processing is a, a processing time required per device in the device reconnection processing is b ($=a/(n\times 2)$), and a time duration that indicates the time interval to be tested is c ($b<c<a$), the initial time Td for disconnection processing is obtained by:
Td=m×b−c/2, and the time increment k is obtained by:
k=b/(a value of 2 or larger).

7. The testing device according to claim 5, wherein in the device reconnection processing, when the connection processing of all the built-in devices and the device is performed after performing the disconnection processing of all the built-in devices and the device, when a sum of the number of built-in devices and the number of device is n (n is a natural number which is 2 or larger), the performing order of the first connection processing of the device in the device reconnection processing is m-th (m is a natural number and $1<m<n$), a processing time required for the device reconnection processing is a, a processing time required per device in the device reconnection processing is b ($=a/(n\times 2)$), and a time duration that indicates the time interval to be tested is c ($b<c<a$), the initial time Tc for connection processing is obtained by:
Tc=m×b−c/2+a/2, and the time increment k is obtained by:
k=b/(a value of 2 or larger).

8. The testing device according to claim 6, wherein the memory stores y=c/k as the number of times of performing of the to-be-tested processing y, and
when the to-be-tested processing is performed the number of times y stored in the memory without causing an error in association with the disconnecting operation or the connecting operation by the switch in the apparatus, the processor notifies that the test of the to-be-tested processing is normally completed.

9. A method of testing to-be-tested processing by a processor using a switch that connects or disconnects a device and an apparatus that performs the to-be-tested processing, the method comprising:
repeatedly performing the to-be-tested processing in the apparatus plural times; and
once performing a disconnecting operation that allows the switch to disconnect the device from the apparatus or a connecting operation that allows the switch to connect the device to the apparatus, at different timings whenever the to-be-tested processing is performed in the apparatus.

10. The method according to claim 9, wherein an initial time, that defines a timing of performing the disconnecting operation or the connecting operation by the switch during the to-be-tested processing and is stored in a memory, is used as a timing of performing the disconnecting operation or the connecting operation by the switch during first to-be-tested processing, and
a time obtained by adding the timing used recently and a time increment, which is stored in the memory to define the timing, is used as a timing of performing the disconnecting operation or the connecting operation by the switch during second or later to-be-tested processing.

11. The method according to claim 10, wherein when an error occurs in the apparatus in association with the disconnecting operation or the connecting operation by the switch, the error is notified and the to-be-tested processing by the apparatus is completed.

12. The method according to claim 10, wherein when the to-be-tested processing is performed the number of times of performing the to-be-tested processing stored in the memory without causing an error in association with the disconnecting operation or the connecting operation by the switch in the apparatus, it is notified that the test of the to-be-tested processing is normally completed.

13. The method according to claim 10, wherein the to-be-tested processing is device reconnection processing for built-in devices of the apparatus and the device which is provided outside the apparatus, the device reconnection processing being performed by a BIOS (basic input output system) of the apparatus, and
the disconnecting operation or the connecting operation by the switch is performed at different timings for every to-be-tested processing so that first disconnection processing or first connection processing of the device by the device reconnection processing competes against second disconnection processing or second connection processing which is performed by the BIOS in association with the disconnecting operation or the connecting operation by the switch in the apparatus.

14. A computer-readable recording medium having stored therein a testing program for causing a processor to execute a process for testing to-be-tested processing using a switch that connects or disconnects a device and an apparatus that performs the to-be-tested processing, the process comprising:
repeatedly performing the to-be-tested processing in the apparatus plural times; and
once performing a disconnecting operation that allows the switch to disconnect the device from the apparatus or a connecting operation that allows the switch to connect the device to the apparatus, at different timings whenever the to-be-tested processing is performed in the apparatus.

15. The computer-readable recording medium according to claim 14, wherein an initial time, that defines a timing of performing the disconnecting operation or the connecting operation by the switch during the to-be-tested processing and is stored in a memory, is used as a timing of performing the disconnecting operation or the connecting operation by the switch during a first to-be-tested processing, and
a time obtained by adding the timing used recently and a time increment, that is stored in the memory to define the timing, is used as a timing of performing the disconnecting operation or the connecting operation by the switch during second or later to-be-tested processing.

16. The computer-readable recording medium according to claim 15, the process further comprising: when an error occurs in the apparatus in association with the disconnecting operation or the connecting operation by the switch, notifying the error and completing the to-be-tested processing by the apparatus.

17. The computer-readable recording medium according to claim 15, the process further comprising: when the to-be-tested processing is performed the number of times of performing the to-be-tested processing, which is stored in the memory, without causing an error in association with the disconnecting operation or the connecting operation by the switch in the apparatus, notifying that the test of the to-be-tested processing is normally completed.

18. The computer-readable recording medium according to claim 15, wherein the to-be-tested processing is device reconnection processing for built-in devices of the apparatus and the device which is provided outside the apparatus, the device reconnection processing being performed by a BIOS (basic input output system) of the apparatus, and the process further comprising: performing the disconnecting operation or the connecting operation by the switch at different timings for every to-be-tested processing so that first disconnection processing or first connection processing of the device by the device reconnection processing competes against second disconnection processing or second connection processing which is performed by the BIOS in association with the disconnecting operation or the connecting operation by the switch in the apparatus.

19. The computer-readable recording medium according to claim 18, wherein in the device reconnection processing, when the connection processing of all the built-in devices and the device is performed after performing the disconnection processing of all the built-in devices and the device, when a sum of the number of built-in devices and the number of device is n (n is a natural number which is 2 or larger), the performing order of the first disconnection processing of the device in the device reconnection processing is m-th (m is a natural number and 1<m<n), a processing time required for the device reconnection processing is a, a processing time required per device in the device reconnection processing is b (=a/(n×2)), and a time duration that indicates the time interval to be tested is c (b<c<a), the initial time Td for disconnection processing is obtained by:

Td=m×b−c/2, and the time increment k is obtained by:
k=b/(a value of 2 or larger).

20. The computer-readable recording medium according to claim 18, wherein in the device reconnection processing, when the connection processing of all the built-in devices and the device is performed after performing the disconnection processing of all the built-in devices and the device, when a sum of the number of built-in devices and the number of device is n (n is a natural number which is 2 or larger), the performing order of the first connection processing of the device in the device reconnection processing is m-th (m is a natural number and 1<m<n), a processing time required for the device reconnection processing is a, a processing time required per device in the device reconnection processing is b (=a/(n×2)), and a time duration that indicates the time interval to be tested is c (b<c<a), the initial time Tc for connection processing is obtained by:

Tc=m×b−c/2+a/2, and the time increment k is obtained by:
k=b/(a value of 2 or larger).

\* \* \* \* \*